(12) United States Patent
Noon et al.

(10) Patent No.: US 8,902,099 B2
(45) Date of Patent: Dec. 2, 2014

(54) WORK AREA MONITOR

(75) Inventors: David Noon, Pullenvale (AU); Patrick T. Bellett, The Gap (AU)

(73) Assignee: Groundprobe Pty Ltd, Windsor, Queensland (AU)

( * ) Notice: Subject to any disclaimer, the term of this patent is extended or adjusted under 35 U.S.C. 154(b) by 46 days.

(21) Appl. No.: 13/810,608

(22) PCT Filed: Aug. 16, 2011

(86) PCT No.: PCT/AU2011/001042
§ 371 (c)(1),
(2), (4) Date: Jan. 16, 2013

(87) PCT Pub. No.: WO2012/021923
PCT Pub. Date: Feb. 23, 2012

(65) Prior Publication Data
US 2013/0120182 A1   May 16, 2013

(30) Foreign Application Priority Data

Aug. 16, 2010   (AU) ................................ 2010903669
Nov. 24, 2010   (AU) ................................ 2010905208

(51) Int. Cl.
| | | |
|---|---|---|
| G01S 13/00 | (2006.01) | |
| G01S 13/88 | (2006.01) | |
| G01S 7/06 | (2006.01) | |
| G01S 13/89 | (2006.01) | |
| G08B 7/06 | (2006.01) | |
| G08B 27/00 | (2006.01) | |
| G01S 7/04 | (2006.01) | |
| G01S 7/00 | (2006.01) | |

(52) U.S. Cl.
CPC ............... *G01S 13/885* (2013.01); *G01S 7/062* (2013.01); *G01S 13/89* (2013.01); *G08B 7/06* (2013.01); *G08B 27/006* (2013.01); *G08B 27/008* (2013.01); *G01S 7/04* (2013.01); *G01S 7/003* (2013.01)
USPC ............................................... 342/22; 342/70

(58) Field of Classification Search
CPC ....... G01S 13/88; G01S 13/89; G01S 13/867; G01S 7/295; G01S 7/414; G01S 13/50; G01S 13/886; G01S 13/90; G01S 13/9023; G01S 17/936; G01C 11/00; G01F 23/284
USPC ..................... 342/22, 52, 53, 55, 70–78, 165, 342/173–175
See application file for complete search history.

(56) References Cited

U.S. PATENT DOCUMENTS 4,796,029 A * 1/1989 Duppong et al. ................ 342/13
5,192,953 A * 3/1993 Tomita ............................. 342/22
(Continued)

OTHER PUBLICATIONS

Little, M.J., Slope Monitoring Strategy at PPRust Open Pit Operation, pp. 211-230, 2006, South African Institute of Mining and Metallurgy, Johannesburg, South Africa.*

(Continued)

*Primary Examiner* — Peter Bythrow
(74) *Attorney, Agent, or Firm* — Howard & Howard Attorneys PLLC

(57) ABSTRACT

A Work Area Monitor comprising a radar module mounted on a motorised vehicle. The Work Area Monitor provides early warning of slope failure in a work area by generating an alarm if movement detected in movement data derived from interferometrically processed radar images exceeds a threshold.

35 Claims, 17 Drawing Sheets

(56) References Cited

U.S. PATENT DOCUMENTS

| | | | |
|---|---|---|---|
| 5,552,787 A * | 9/1996 | Schuler et al. | 342/25 A |
| 5,592,170 A * | 1/1997 | Price et al. | 342/22 |
| 5,900,833 A * | 5/1999 | Sunlin et al. | 342/22 |
| 5,950,140 A * | 9/1999 | Smith | 702/2 |
| 6,097,329 A * | 8/2000 | Wakayama | 342/26 D |
| 6,657,589 B2 * | 12/2003 | Wang et al. | 342/383 |
| 6,690,316 B2 * | 2/2004 | Yankielun | 342/22 |
| 6,696,974 B1 * | 2/2004 | Mathis | 340/854.7 |
| 6,838,671 B2 * | 1/2005 | Compana et al. | 250/349 |
| 6,850,183 B2 * | 2/2005 | Reeves et al. | 342/22 |
| 7,148,836 B2 * | 12/2006 | Romero et al. | 342/22 |
| 7,183,989 B2 * | 2/2007 | Tietjen | 343/757 |
| 7,190,302 B2 * | 3/2007 | Biggs | 342/22 |
| 7,479,918 B2 * | 1/2009 | Johnson et al. | 342/22 |
| 7,656,341 B2 * | 2/2010 | Reeves | 342/22 |
| 7,714,765 B2 * | 5/2010 | Stickley et al. | 342/25 R |
| 7,768,442 B2 * | 8/2010 | Stickley et al. | 342/28 |
| 7,782,251 B2 * | 8/2010 | Bishop et al. | 342/179 |
| 7,855,640 B2 * | 12/2010 | Reeves et al. | 340/540 |
| 7,898,461 B2 * | 3/2011 | Stickley et al. | 342/28 |
| 7,903,038 B2 * | 3/2011 | Tietjen | 343/711 |
| 8,154,435 B2 * | 4/2012 | Pett et al. | 342/25 R |
| 8,668,386 B2 * | 3/2014 | Morton et al. | 378/198 |
| 2001/0046258 A1 * | 11/2001 | Wise et al. | 375/219 |
| 2004/0046690 A1 * | 3/2004 | Reeves et al. | 342/175 |
| 2005/0128125 A1 * | 6/2005 | Li et al. | 342/22 |
| 2006/0170584 A1 * | 8/2006 | Romero et al. | 342/22 |
| 2009/0033556 A1 * | 2/2009 | Stickley et al. | 342/374 |
| 2009/0121888 A1 * | 5/2009 | Reeves et al. | 340/669 |
| 2009/0121921 A1 * | 5/2009 | Stickley et al. | 342/179 |
| 2009/0135051 A1 * | 5/2009 | Bishop et al. | 342/175 |
| 2010/0026551 A1 * | 2/2010 | Szwilski et al. | 342/22 |
| 2010/0045513 A1 * | 2/2010 | Pett et al. | 342/25 C |
| 2011/0169682 A1 * | 7/2011 | Chen | 342/21 |
| 2011/0199254 A1 * | 8/2011 | Bishop et al. | 342/179 |

OTHER PUBLICATIONS

Kayesa, G., Prediction of Slope Failure at Letlhakane Mine with Geomos Slope Monitoring System, pp. 605-622, 2006, South African INstitute of Mining and Metallurgy, Johannesburg, South Africa.*

Gleeson, D., Sustaining South Africa, pp. 16-29, Jan. 2009, International Mining.*

"U.S. Army Receives First Lockheed Martin EQ-36 Counterfire Target Acquisition Radar System", Jul. 7, 2009, Retrieved Jun. 24, 2014 from http://www.lockheedmartin.com/us/news/press-releases/2009/july/USArmyReceivesFirstLockhe.html. Image retrieved Jun. 24, 2012 from http://ms2.external.lmco.com/data/EQ36_YUMA_hi-res.jpg.*

O'Neill, Peggy E., Petrella, John J., Fuchs, John E., "Multi-frequency Truck-mounted Radar System", Jun. 1996. Hydrology Data Report: Wishita '94. NAWQL 96-1. US Department of Agriculture—Agricultural Research Service, Durant, Oklahoma.*

International Search Report (Date of Mailing Nov. 28, 2011).

GroundProbe Slope Stability Radar Making Mining Safer Brochure 2007.

GroundProbe Slope Stability Radar Decision Confidence Brochure 2009.

GroundProbe Slope Monitoring SSR T-Series Brochure 2010.

GroundProbe Slope Stability Radar GP/SSR03/10.12 Brochure—Oct. 2012.

Gleeson, D., Sustaining South Africa, pp. 16, 18, 20-24, 26, 28-29,Jan. 2009, Int'l Mining.

* cited by examiner

FIG. 16

WORK AREA MONITOR

CROSS REFERENCE TO RELATED APPLICATION

This application is a national stage application of PCT/AU2011/001042, filed Aug. 16, 2011, which claims priority to Australian Patent Application No. 2010-903669, filed Aug. 16, 2010 and Australian Patent Application No. 2010-905280, filed Nov. 24, 2010, the disclosures of which are hereby incorporated by reference in their entirety.

FIELD OF THE INVENTION

This invention relates to a work area monitor that employs radar to detect movement of a slope and raise an alarm if dangerous movement is detected. The invention is particularly useful for open cut mine sites and civil excavation sites, and potentially useful for underground mines.

BACKGROUND TO THE INVENTION

The use of radar to produce interferometry maps for identifying movement in a slope is known. U.S. Pat. No. 6,850,183 describes a slope monitoring system that consists of a radar module that records radar images of a selected slope and a video module that records visual images of the same slope. A data processor performs coordinate registration to align the radar images and the visual images. Slope movement is detected by interferometry. The invention is embodied in a product produced by GroundProbe Pty Ltd that is referred to as the SSR.

The SSR product has been used very successfully to monitor the stability of large slopes in open-cut mines. The SSR has detected and provided an alarm prior to many hundreds of large slope failures and is widely recognised as an essential mine safety tool. Nonetheless, the SSR is not ideal for all situations.

Mine workers are exposed to a number of major hazards including sudden or unexpected movement of ground in their immediate work area. Mine workers are not equipped with the knowledge or tools to understand whether a wall that they are planning to work under is and remains safe. SSR is used by mine geotechnical engineers to assess overall slope stability over an extended period, typically days or weeks, and to critically monitor slopes that are actively moving and may become unsafe. The complexity of SSR allows for geotechnical engineers to assess movement types and movement rates across multiple work areas of a mine from long ranges, with alarm capability to a central location. However there are specific work areas in a mine that are not adequately covered or alarmed by SSR. What is required is a simple short-range, fast-scanning tool that can be operated directly by a work crew and can provide a local alarm with sufficient warning when a movement occurs within the work area.

OBJECTS OF THE INVENTION

It is an object of the present invention to provide a Work Area Monitor (referred to as WAM).

It is another object of the invention to overcome or at least alleviate one or more of the above limitations.

Further objects will be evident from the following description.

SUMMARY OF THE INVENTION

In one form, although it need not be the only or indeed the broadest form, the invention resides in a Work Area Monitor comprising;

a radar module that scans a selected field of view and collects radar images;

a display that shows an image of the field of view;

a processor that processes the radar images interferometrically to extract movement data and analyse the movement data;

an alarm that provides an audible, visible or tactile warning if the movement data exceeds a threshold; and a motorised vehicle mounting the radar module and the processor.

The image of the field of view may be overlaid with the movement data on the display. Suitably this will only be if the movement data exceeds the threshold, although movement data below the threshold could be displayed if desired.

The Work Area Monitor may also include a camera. The camera is suitably a digital camera capable of recording sequential still images or video images. The camera is preferably mounted on the vehicle separate from the radar module. Alignment between the radar field of view and the camera field of view is preferably set up during manufacture. The camera preferably takes a new image during every radar scan so any movement of the slope measured by the radar and the location of the movement is visually captured at the time of detection. The camera may have low light capability to work effectively at night.

The radar module is preferably mounted on a scanning gimbal with a scan increment of 2° horizontally×2° vertically. This is a larger scan increment than an SSR but the work area monitor is located much closer to the wall and the scan increment of 2.0 m×2.0 m at 60 metres range is sufficient to detect rock falls, sub-bench and multi-bench failures in the work area. The scan area may be rectangular and is selectable by the operator to focus on the immediate work area. A typical scan time for an immediate work area is one minute or less, which is much shorter than an SSR and can provide earlier warning of rapid slope failure to the work crew. Typical scan duration for the immediate work area is one shift, or up to 12 hours, which is much shorter than many days or weeks of scan duration for an SSR.

The processor compares successive radar images on a pixel by pixel basis to identify pixels that indicate slope movement of greater than a selected threshold. Suitably the threshold is chosen to be above the error stack of the work area monitor. For the embodied invention, a suitable threshold of 5 mm has been chosen. The threshold may be different in other embodiments but in general the inventors envisage that the threshold will be 5 mm or less. A higher error stack over the SSR can be accommodated by the work area monitor because its scan rate is much quicker and the alarm is localised to the work area only. The operational range of the radar module and processor is about 30 m to about 200 m. This range is short compared to the typical range of an SSR which may be 1000 m or more.

The display may display a synthetic image of the field of view generated from the radar images. The synthetic image may be generated by the processor, or another processor specific to the application. A suitable synthetic image is a digital terrain map. Alternatively the display displays the images recorded by the camera.

The alarm is preferably an audible and visible alarm on the Work Area Monitor platform and may further comprise a personal alarm that is remote from the Work Area Monitor but in communication with the local work area. The personal alarm suitably receives alarms from the processor and generates a local alarm. The personal alarm may be carried by a worker and suitably generates tactile and audible alarms.

The vehicle is typically a utility automobile having a cabin and tray back. The vehicle provides a motorised platform for deployment of the Work Area Monitor and the engine may provide a source of power. The cabin may suitably be climate controlled in which case the processor, other electronics and display may be mounted in the cabin.

The vehicle may be mechanically stabilised using legs or jacks.

The work area monitor may further comprise a movement detector mounted on the vehicle that detects any movement of the vehicle that could be misinterpreted as a slope movement. Before an alarm is raised by the processor the movement detector is checked to ensure the vehicle has not moved at a time that could have caused the alarm.

The work area monitor may further comprise an anomaly detector module that detects any foreground activity in the field of view that could cause a false alarm.

Suitably the work area monitor further comprises a touch screen interface for set up and operation. Using the touch screen interface a user can select the field of view of the work area monitor and can select a spotlight mode that selectively monitors a subset of the field of view.

Further features and advantages of the present invention will become apparent from the following detailed description.

BRIEF DESCRIPTION OF THE DRAWINGS

To assist in understanding the invention and to enable a person skilled in the art to put the invention into practical effect, preferred embodiments of the invention will be described by way of example only with reference to the accompanying drawings, in which:

FIG. 16 shows an example digital terrain map.

DETAILED DESCRIPTION OF THE INVENTION

Embodiments of the present invention reside primarily in a Work Area Monitor providing a visual image of a slope near a work area overlaid with a movement map obtained from interferometrically analysed radar data. The Work Area Monitor is mounted on a motor vehicle for easy mobility, comfortable user setup and reliable power source. The elements of the Work Area Monitor have been illustrated in concise schematic form in the attached drawings, showing only those specific details that are necessary for understanding the embodiments of the present invention, but so as not to obscure the disclosure with excessive detail that will be readily apparent to those of ordinary skill in the art having the benefit of the present description.

In this specification, adjectives such as first and second, left and right, and the like may be used solely to distinguish one element or action from another element or action without necessarily requiring or implying any actual such relationship or order. Words such as "comprises" or "includes" are intended to define a non-exclusive inclusion, such that a process, method, article, or apparatus that comprises a list of elements does not include only those elements but may include other elements not expressly listed, including elements that are inherent to such a process, method, article, or apparatus.

Figure 1:
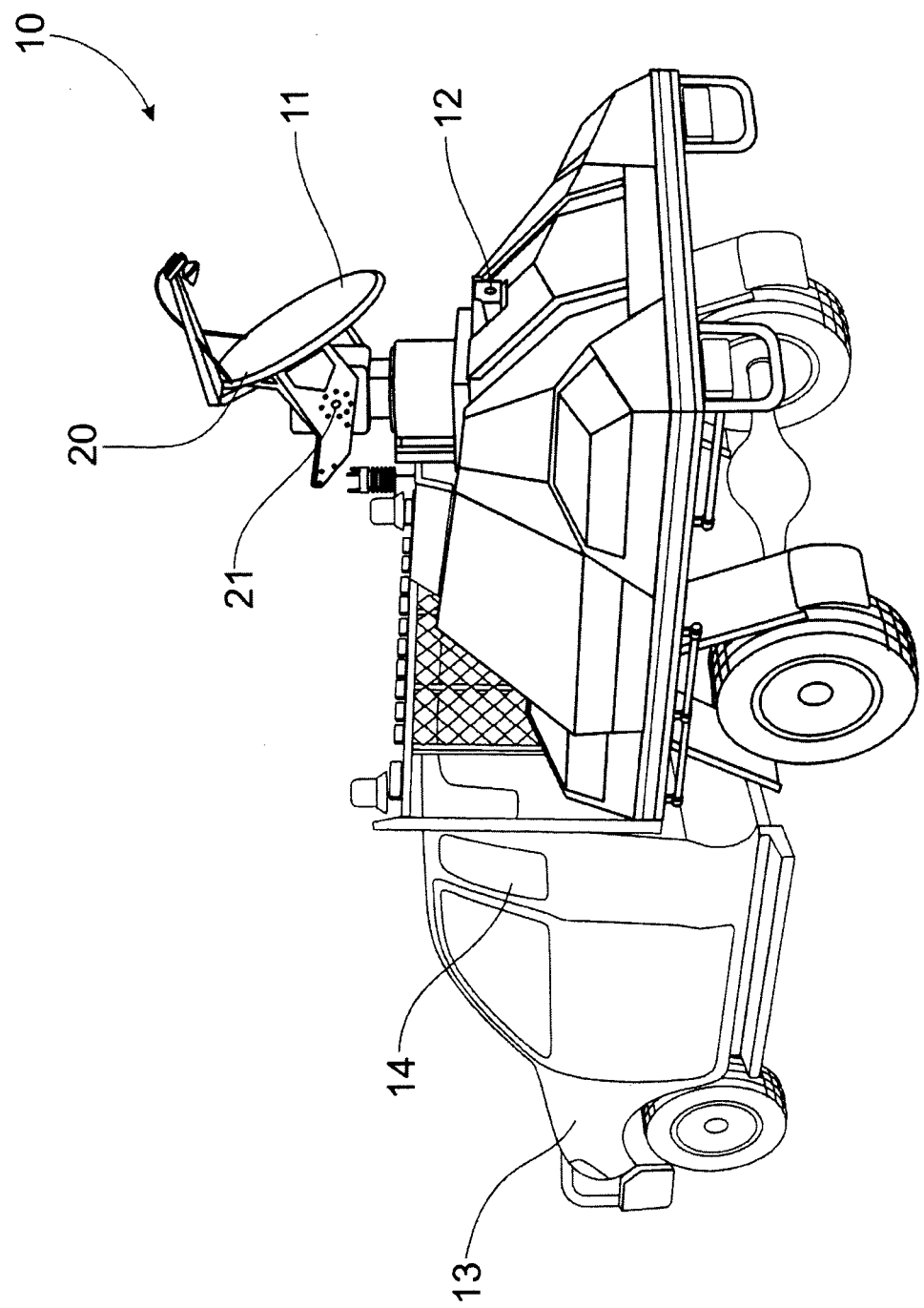
FIG. 1 shows an image of a Work Area Monitor.

Referring to FIG. 1 there is shown a first embodiment of a Work Area Monitor 10. The Work Area Monitor 10 comprises a radar module 11 and (optionally) a camera 12 mounted on the tray of a utility motor vehicle 13 or otherwise associated with the radar module 11. A processor (not visible) is located in the cabin 14 together with the display screen 23.

The radar module 11 is a scanning dish device that consists of a dish 20 mounted on a scanning gimbal 21 that has a vertical scan of −10 to +40 degrees and a horizontal scan of −55 to +55 degrees. The gimbal houses a 600 mm parabolic dish with an offset feed. The antenna transmits and receives radio frequency signals in X-band with T/R gating to separate the direct path from the wall reflection and sufficient range resolution to separate foreground anomalies (such as mining vehicles) from the wall reflections. The mean transmitter RF power supplied to the dish is 30 mW and peak is 60 mW. A phase stable cable connects the dish to the radar module 11. The control for scanning the gimbal is contained in the cabin 14. A computer interface connects the processor to the radar module 11, camera 12 and display screen 23.

Figure 2:
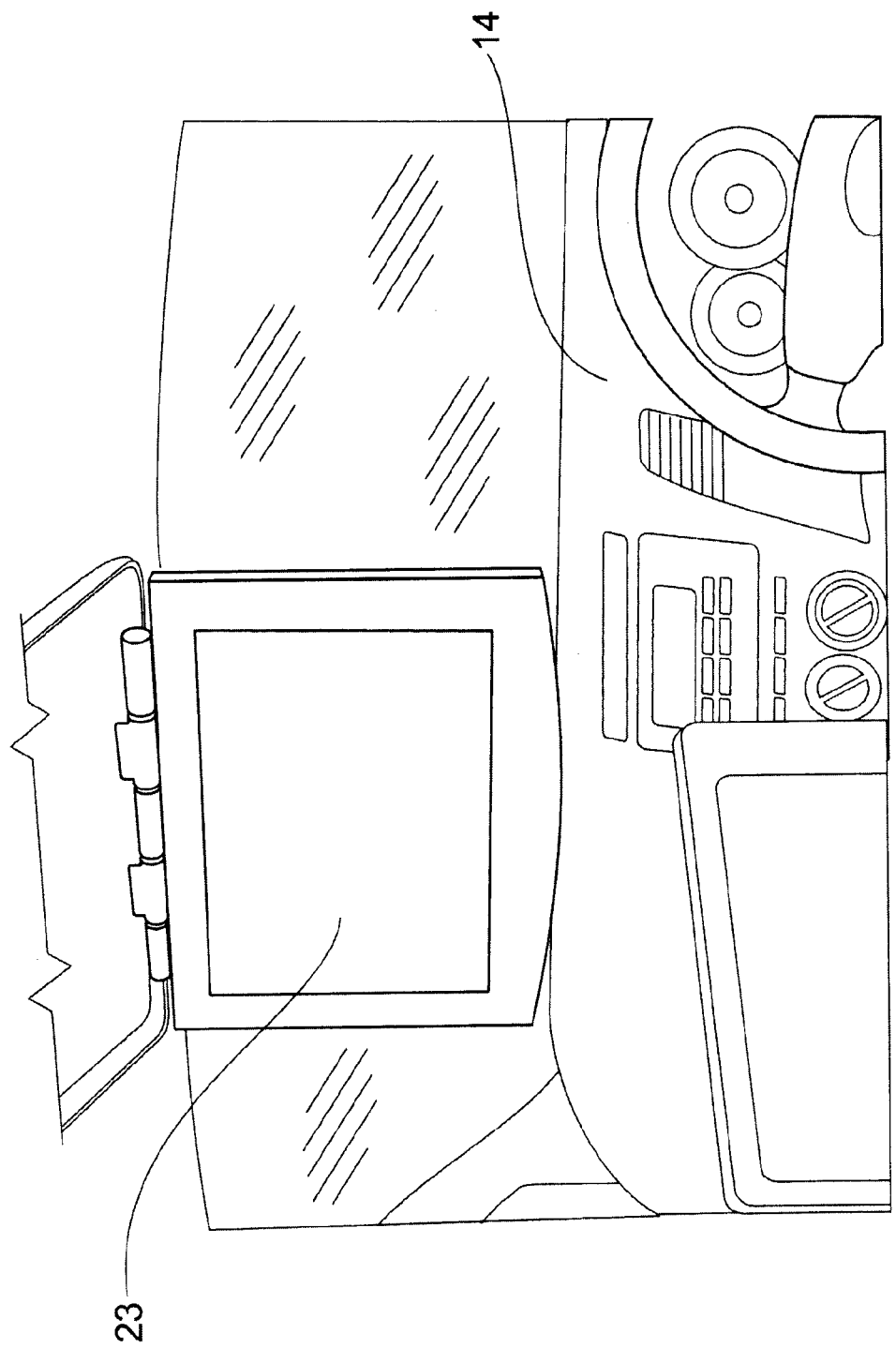
FIG. 2 shows a touch screen interface of the Work Area Monitor.

The camera 12 has a lens that is optically optimised for a wide field of view without distortion in the vertical plane. The camera field of view is 120 degrees by 104 degrees. The image from the camera is displayed on a screen 23 located in the cabin 14 (as seen in FIG. 2).

It is not always practical for the vehicle to be reversed into position so that the camera and radar point at the monitored wall over the back of the vehicle. Therefore, in one alternate embodiment, the camera is configured to be rotatable within a 180 degree field of view centred over the rear of the vehicle. The centre of the radar field of view is aligned with the centre of the camera field of view so that the image viewed on the screen 23 represents what will be monitored by the radar.

In the absence of the camera the radar images are used to generate a synthetic image of the field of view. The synthetic image is able to display salient features in the field of view which a user is able to use for directing the Work Area Monitor. The synthetic image may be a digital terrain map, which is a 3D image comprising azimuth, elevation and range of each pixel measured by the radar. An example of a digital terrain map is shown in the lower part of FIG. 16. The corresponding visual image formed from a composite of photographs is shown in the top part of FIG. 16.

The utility motor vehicle 13 may be a conventional vehicle with a diesel or petrol internal combustion engine. The engine may be left running during operation of the Work Area Monitor so as to provide power to the Work Area Monitor. In the preferred embodiment the Work Area Monitor is operated from batteries that are bulk-charged by the engine of the utility motor vehicle 13. The Work Area Monitor is distinctly different from other slope stability radars in the ability to operate from the tray back of a vehicle while the engine is running. This is due to the unique operating parameters of the Work Area Monitor as described below. It is also convenient to provide a mains power interface for battery trickle-charging as is conventionally known.

The Work Area Monitor 10 is a comparatively short range device that provides movement monitoring of slopes at a range of about 30 metres to about 200 metres. In operation the utility motor vehicle 13 is located so that the radar 11 and camera 12 point at a section of slope or wall to be monitored. An image of the slope as seen by the camera 12 is displayed on the screen 23. The radar dish 20 is aligned with the field of view of the camera 12 during manufacture so that it is known, to within an acceptable degree of accuracy, that the centre of the field of view of the radar corresponds with the centre of the field of view of the camera.

Figure 3:
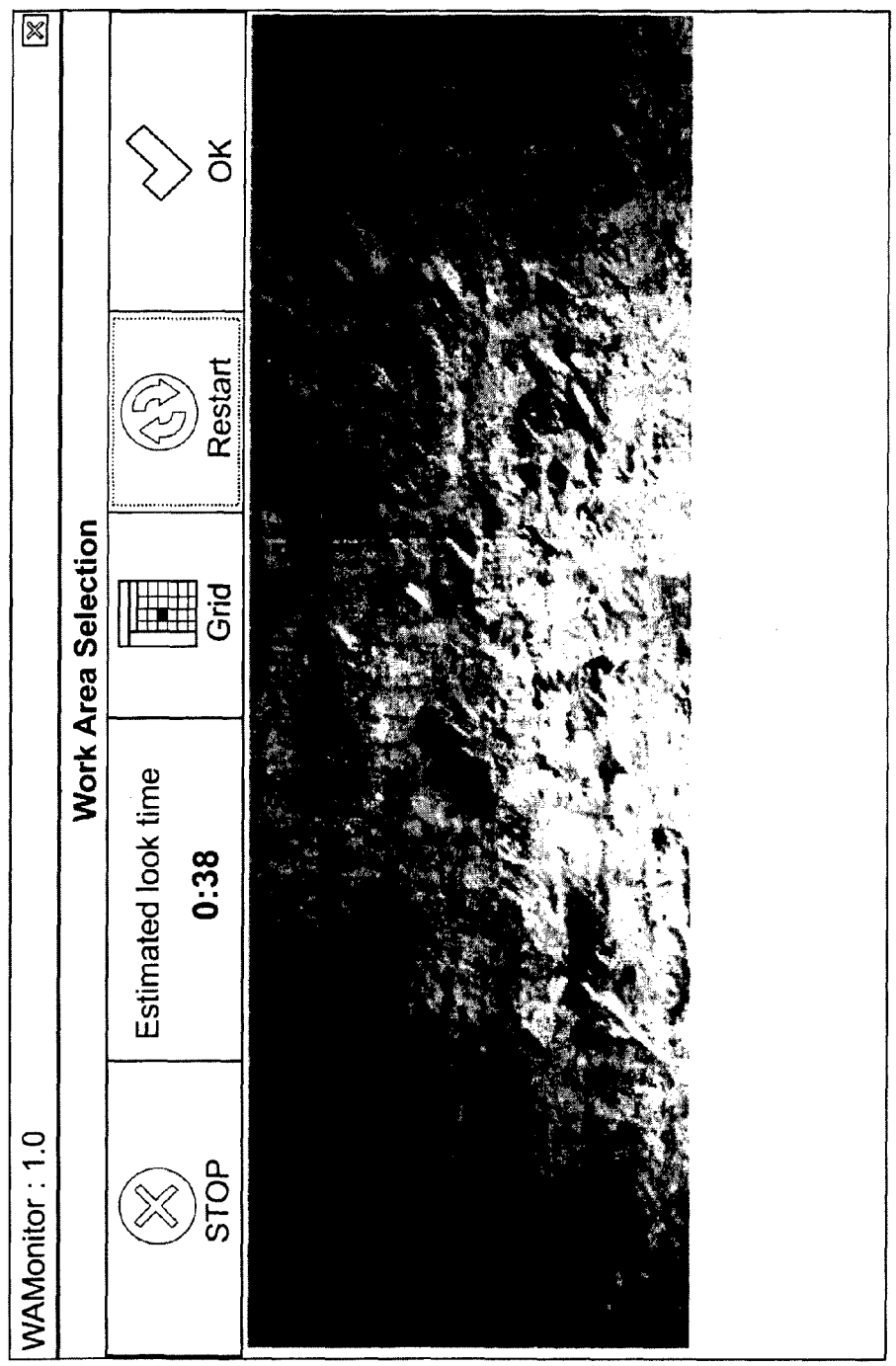
FIG. 3 shows an initial set up screen.

The Work Area Monitor 10 is set up by driving the vehicle 13 to a location from which the area to be monitored can be viewed. The vehicle 13 is positioned so that the radar and (optionally) the camera point at the monitored area. The system is turned on using a single switch in the cabin 14. After a short pause an initial screen is displayed, for example as shown in FIG. 3.

Figure 4:
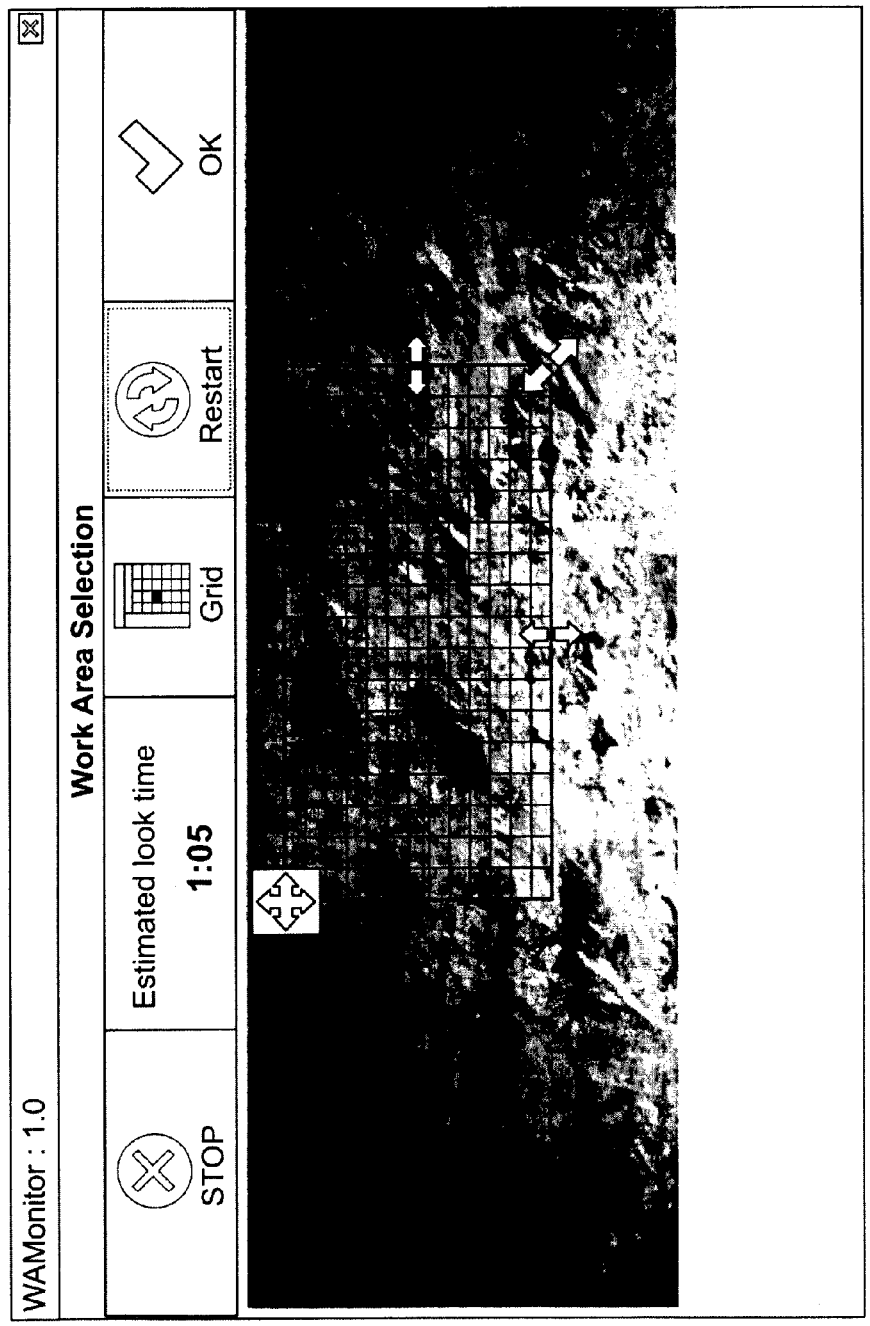
FIG. 4 shows the screen of FIG. 3 with a work selection area.

An operator selects a region of wall to monitor. In the preferred embodiment the screen 23 is a touch screen and the operator selects the region by tracing the region on the touch screen. A grid of pixels is overlayed on the scene to display the area that will be monitored. The area can be adjusted by moving the corners of the area, as shown in FIG. 4. The user clicks 'OK' on the work area selection screen to commence monitoring.

Figure 5:
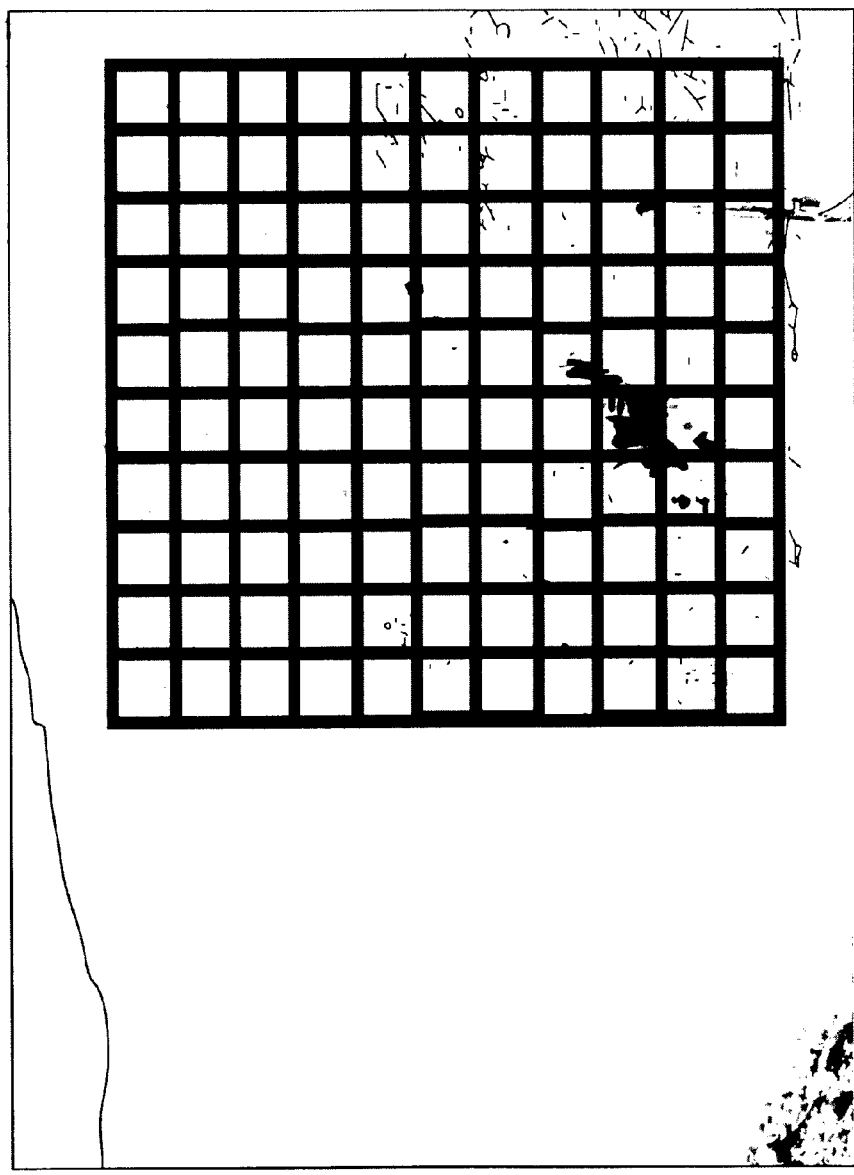
FIG. 5 indicates how the selected radar scan and pixels are overlayed on the camera's field of view of a slope.

The grid of pixels are also used to display which pixels have moved to sound the alarm, as seen in FIG. 5 and described in greater detail below.

Figure 6:
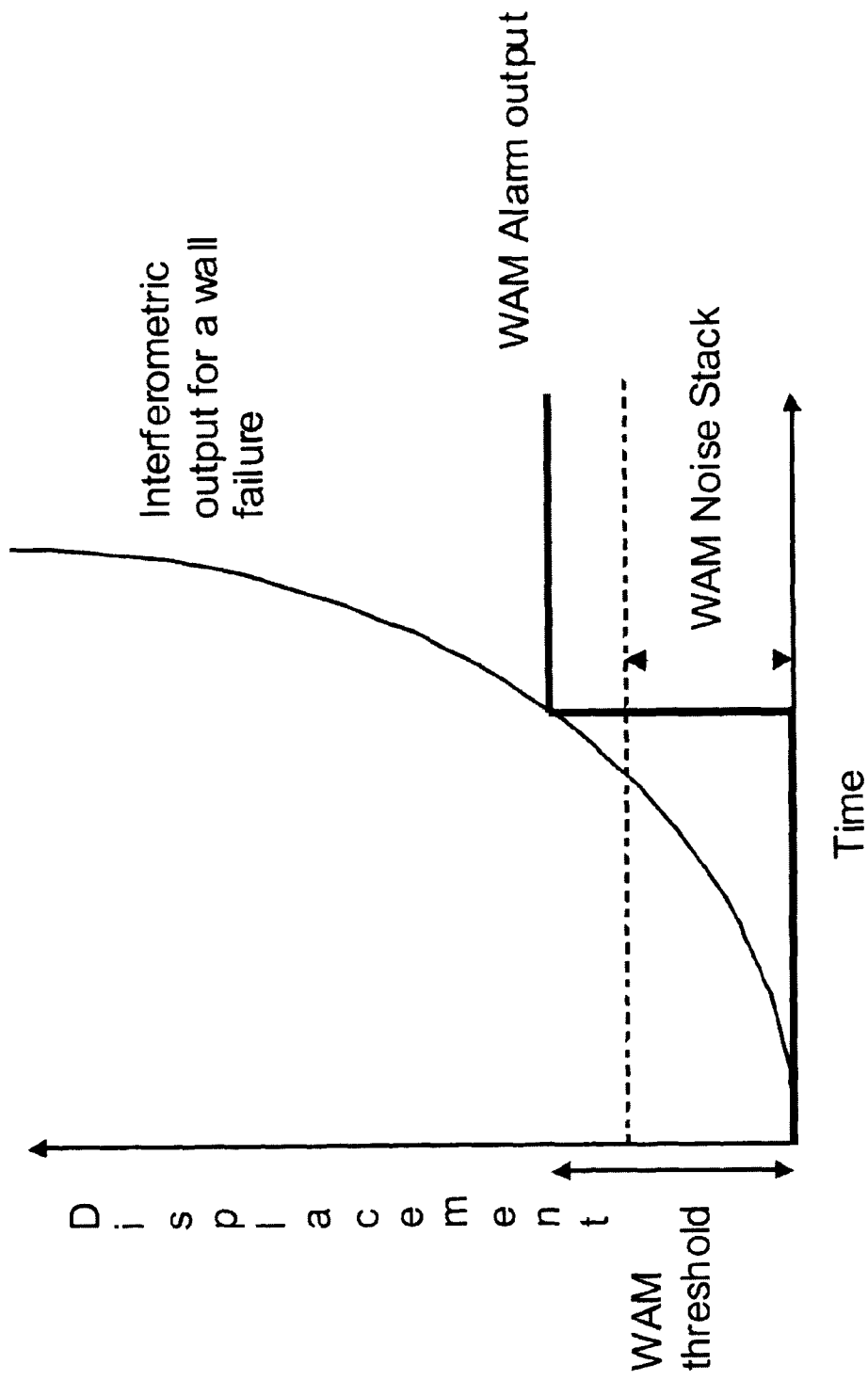
FIG. 6 is a diagram showing the Work Area Monitor output derived from interferometrically-measured displacement.

The gimbal mount 21 scans the radar dish 20 to collect reflected radar signals at a rate to build an interferometric map of the scene in a scan time of between about 20 seconds and 2 minutes, with scan rates of one minute or less being preferable to provide sufficient warning. The interferometric map is constructed in the same manner as described in U.S. Pat. No. 6,850,183. The interferometric map that is generated has a deformation precision that allows movements above the error stack of the system to be easily detected. FIG. 6 shows the displacement versus time output of a single pixel in the interferometric map for a wall progressing towards failure. The threshold is selected above the error stack of the system.

In one embodiment the output of the work area monitor is a binary alarm based on whether wall movement has been detected ('1') or not detected ('0'). The Work Area Monitor operates over a short time scale of minutes and hours and alarms when there is movement in the local work area rather than providing displacement measurements of the slope over days to weeks as is the case with the SSR. The Work Area Monitor is a short term monitor that can afford a higher error stack to achieve ease of use.

It has been found from many measurements of slope failure using the SSR that initial movements of a few to many millimetres are apparently always present as a precursor to a larger movement. Thus, as a safety device, the Work Area Monitor is very useful as a short term, short range safety device that detects movements of a few millimetres or more and provides a warning to workers in the immediate area. This compliments the operation of the SSR described in U.S. Pat. No. 6,850,183, which provides longer term, high precision displacement measurements over a much larger wall area.

Figure 7:
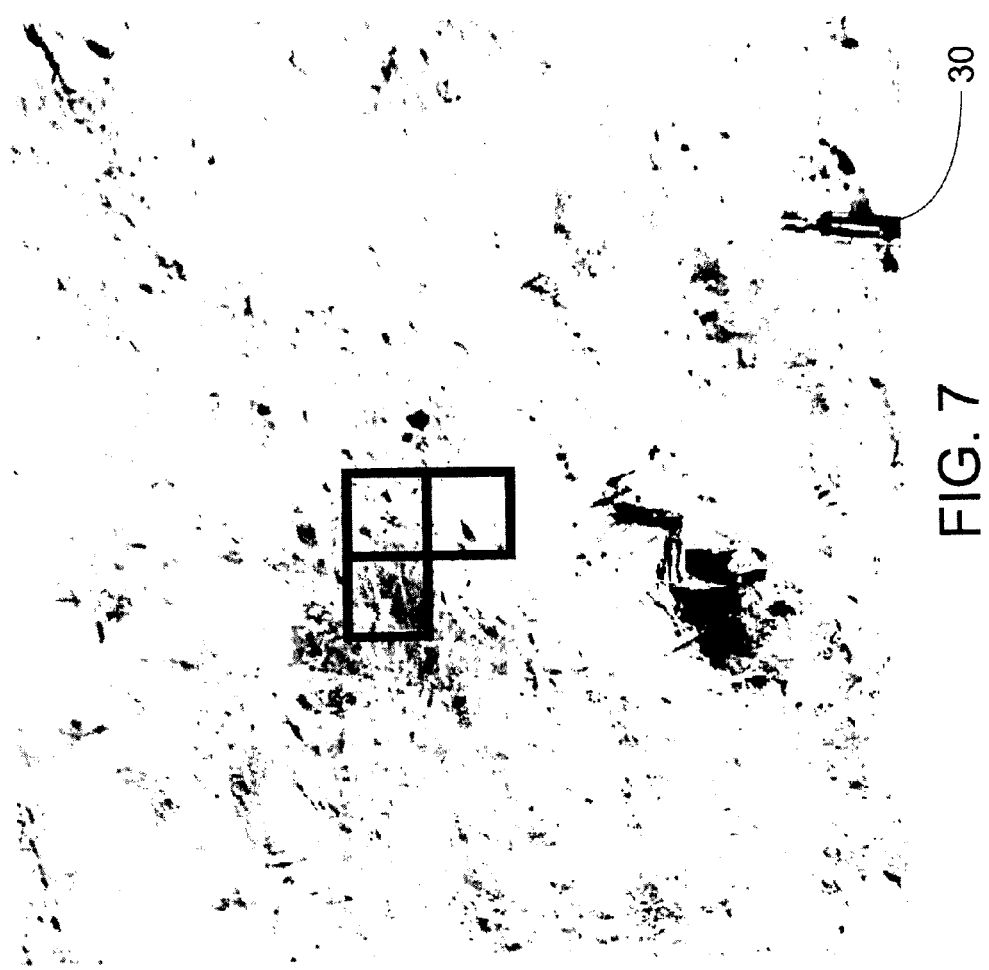
FIG. 7 demonstrates the pixels in the selected radar scan area that have alarmed.

An alarm is generated by setting a threshold for detected movement. If the radar processing results in a detected movement of greater than the set threshold the Work Area Monitor generates an audible and visible alarm that warns workers that they should vacate the area. In addition, the moving area may be highlighted on the screen 23 using a colour code. FIG. 7 shows the output of the screen 23 where a wall region with red overlay has moved. Another preferred option is to flash the pixels that show movement above the threshold.

The Work Area Monitor triggers an alarm based on the following parameters:
  Threshold: The movement in 'mm' of the work area to be considered as dangerous;
  Alarming Cells: Determines the minimum size of the area to have moved before considering the movement as dangerous;
  Looks: The number of looks over which the movement is to be measured;
  Direction: The direction of the movement of the work area being monitored.

If the work area contains vegetation or machinery a false alarm may be generated. Areas that may generate a false alarm can be masked. An 'Edit Mask' mode is selected and a green mask is drawn over the problem areas as described in more detail below.

In another embodiment dimensionless alarms are calculated as described in our earlier published international application number WO2007012112 titled METHOD AND SYSTEM OF DETERMINING ALARM CONDITIONS.

In many work sites the audible and visible alarm may not be immediately noticed. Therefore, in one embodiment, the Work Area Monitor includes a personal alarm that is carried by each worker. The Work Area Monitor generates a short range radio signal (or other suitable communication carrier) that triggers the personal alarm to provide a tactile and audible alarm, typically this would be a vibration and a buzzing, to warn the carrier to leave the area.

The worker may also be provided with a display device that shows an image of the monitored wall indicating the region of movement. Modern communication devices, such as smart phones; are compact with relatively large screens. They also incorporate modems for short range and long range wireless communication.

If an alarm has sounded or if there is a suspect rock hanging on the wall, the Work Area Monitor may be operated in a spotlight mode. In spotlight mode a user is able to select a single pixel from the display shown in FIG. 5. The radar then ceases scanning and focuses on the selected pixel with much faster measurement time, typically many times per second. This allows a suspect region of the monitored slope to be monitored more intensely.

It is possible in a mining environment that disturbances could occur that generate a false movement alarm. Generally these disturbances fall into two categories: non-slope movements within the field of view of the radar; movement of the Work Area Monitor. The first category of disturbances can be detected and ignored by detecting differential range changes or by comparing the short-term and long-term coherence of the radar. A movement within the radar field of view, for instance the tip of the drill rig mast 30 in the foreground of FIG. 5 and FIG. 7, will have highly differential ranges from the slope, or will have low short-term coherence compared to the long-term coherence whereas a movement of the slope will have both high short-term and high long-term coherence.

Figure 8:
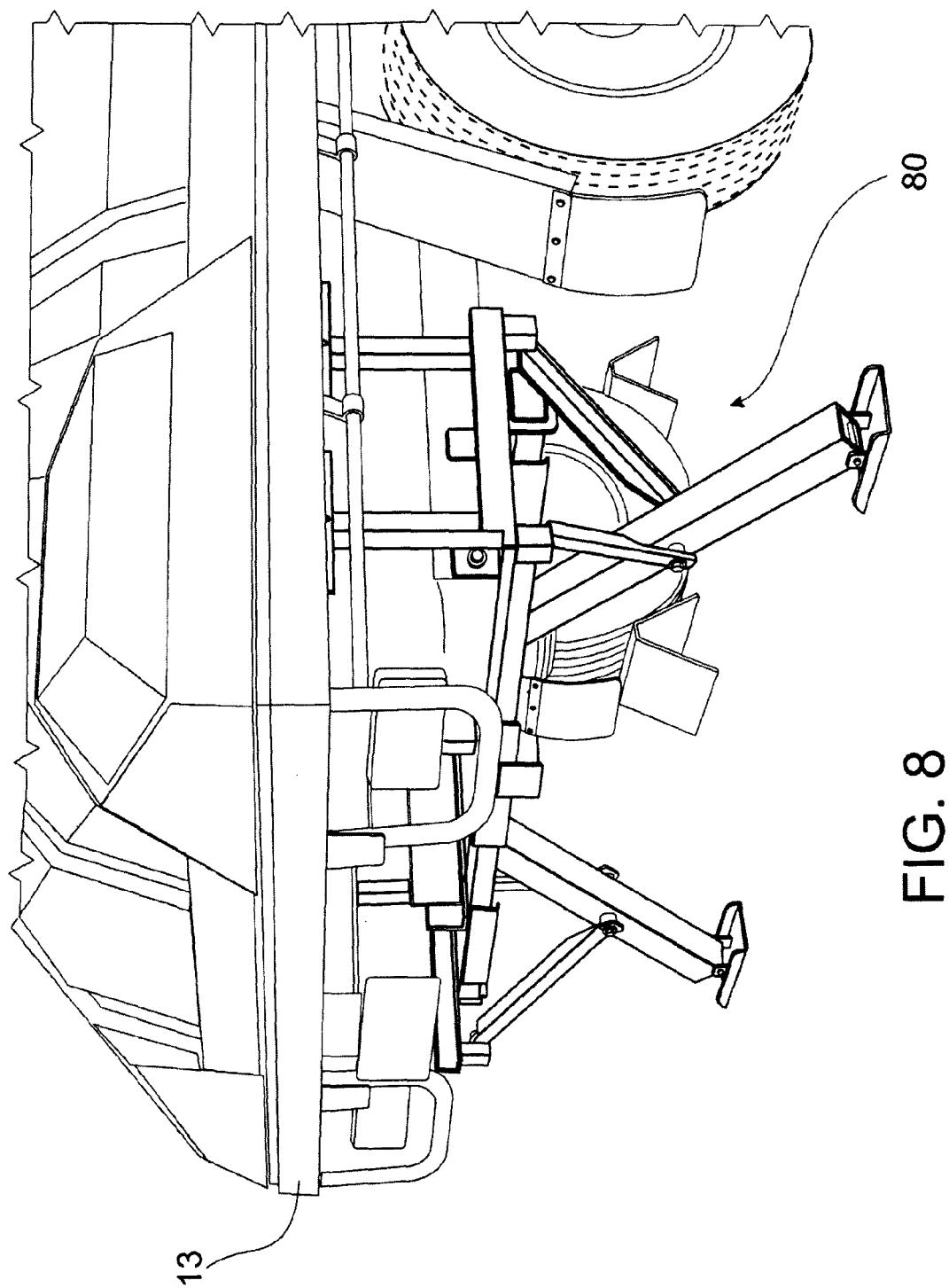
FIG. 8 shows one form of vehicle stabilisation.
Figure 17:
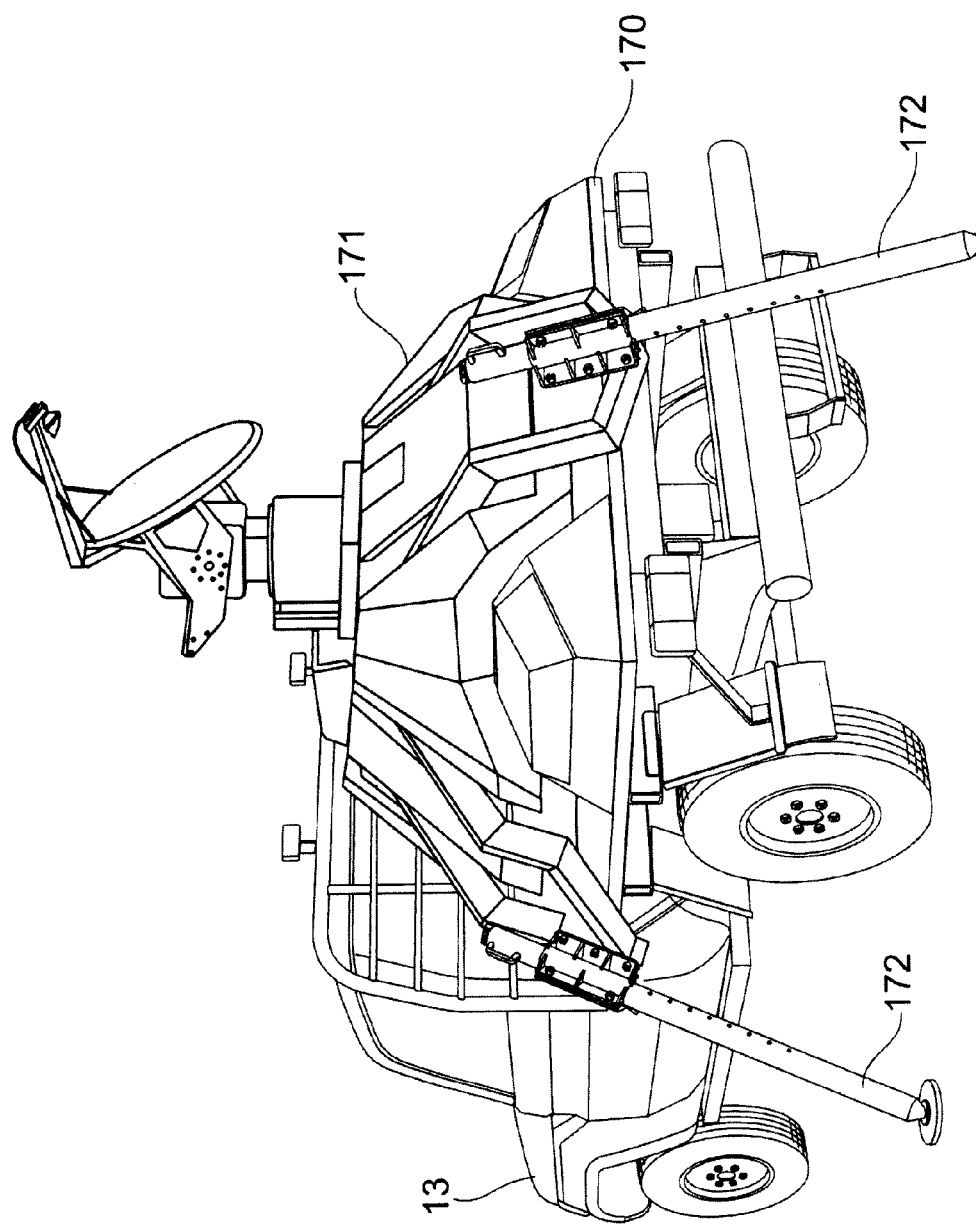
FIG. 17 shows an alternate form of vehicle stabilisation.

The second category of disturbances can be eliminated by using a vehicle stabilising apparatus on the front and/or rear of the vehicle, such as those used for stabilising large recreational vehicles. One example of a rear stabilisation device is shown in FIG. 8 and another example is shown in FIG. 17. The stabilisation device shown in FIG. 8 comprises a pair of legs, such as 80, that are lowered to take a portion of the weight of the vehicle. A similar device is used at the front of the vehicle. The inventors have found that the stabilisation works most effectively if the legs take about 10% to about 20% of the weight of the vehicle.

The example shown in FIG. 17 comprises a jack (not visible) under the radar module 171. The jack lifts the radar module 171 off the tray of the vehicle 170. The legs 172 are extended and clamped in position so that the radar module is supported by the ground rather than the vehicle 170.

Alternatively (or as well) the Work Area Monitor can employ a movement detection device such as tilt metres or accelerometers or other motion detection devices. Any movement of the Work Area Monitor, such as due to a person entering the vehicle or strong wind gusts will be detected by the movement detection device and the apparent corresponding movement of the slope will be ignored.

Figure 9:
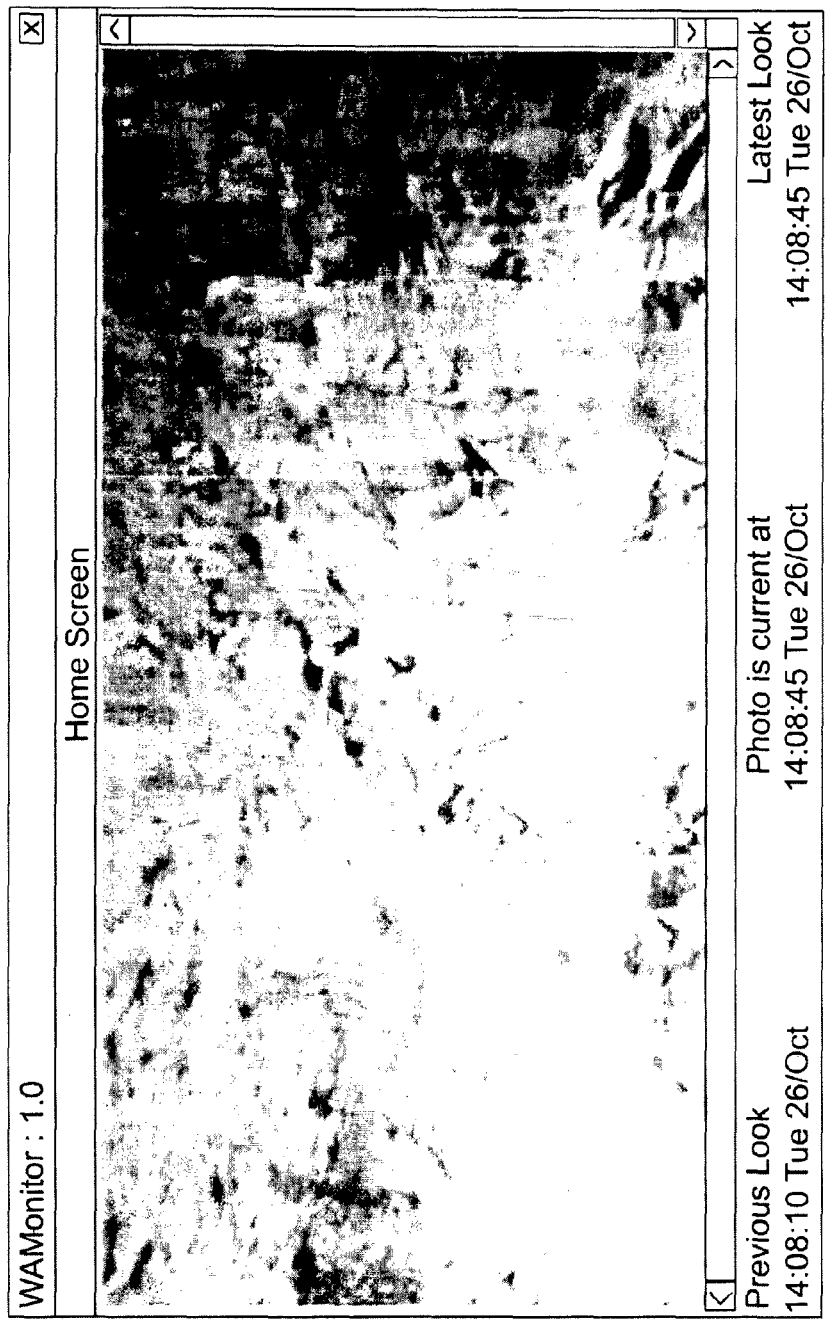
FIG. 9 shows a user screen observing a slope without movement.
Figure 10:
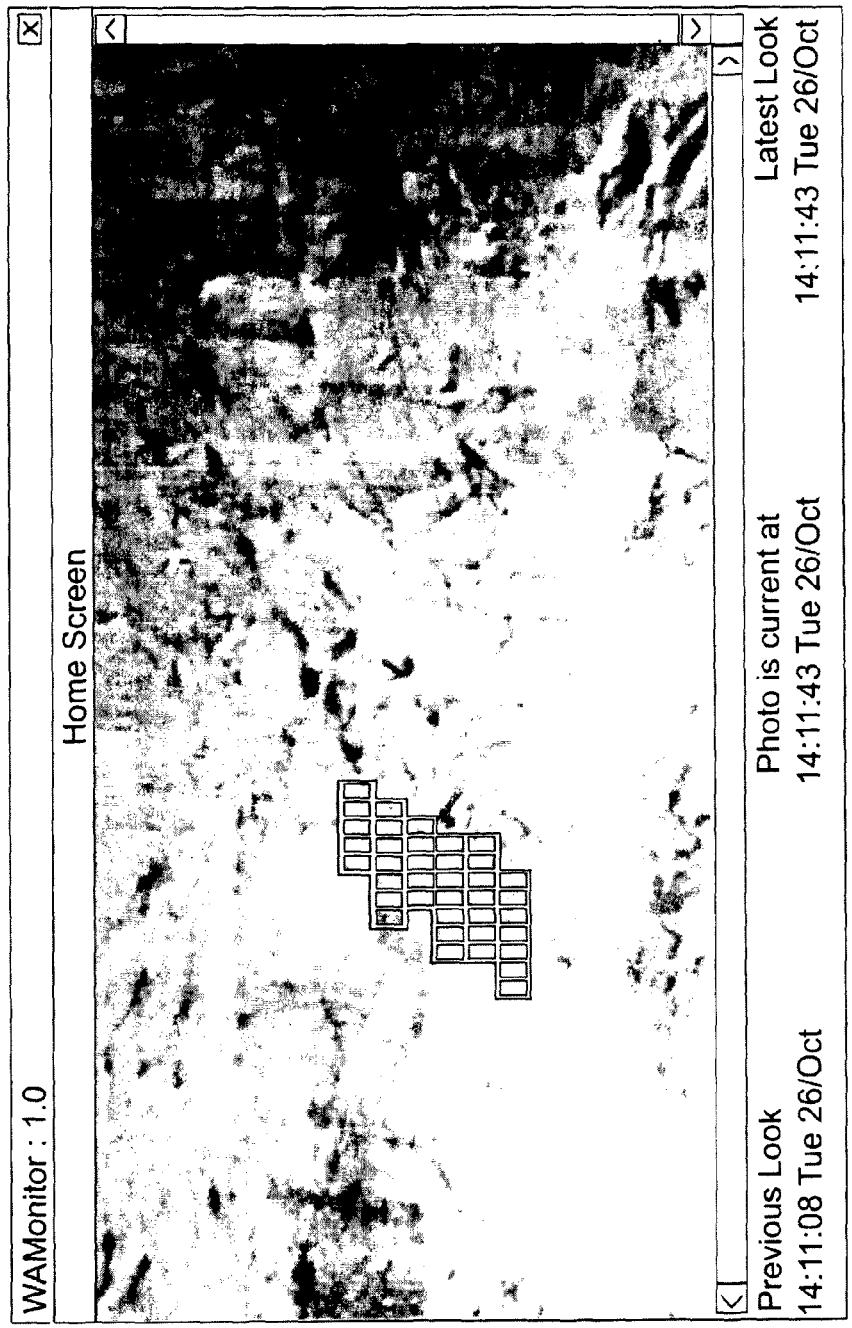
FIG. 10 shows the screen of FIG. 9 but now with initial movement.
Figure 11:
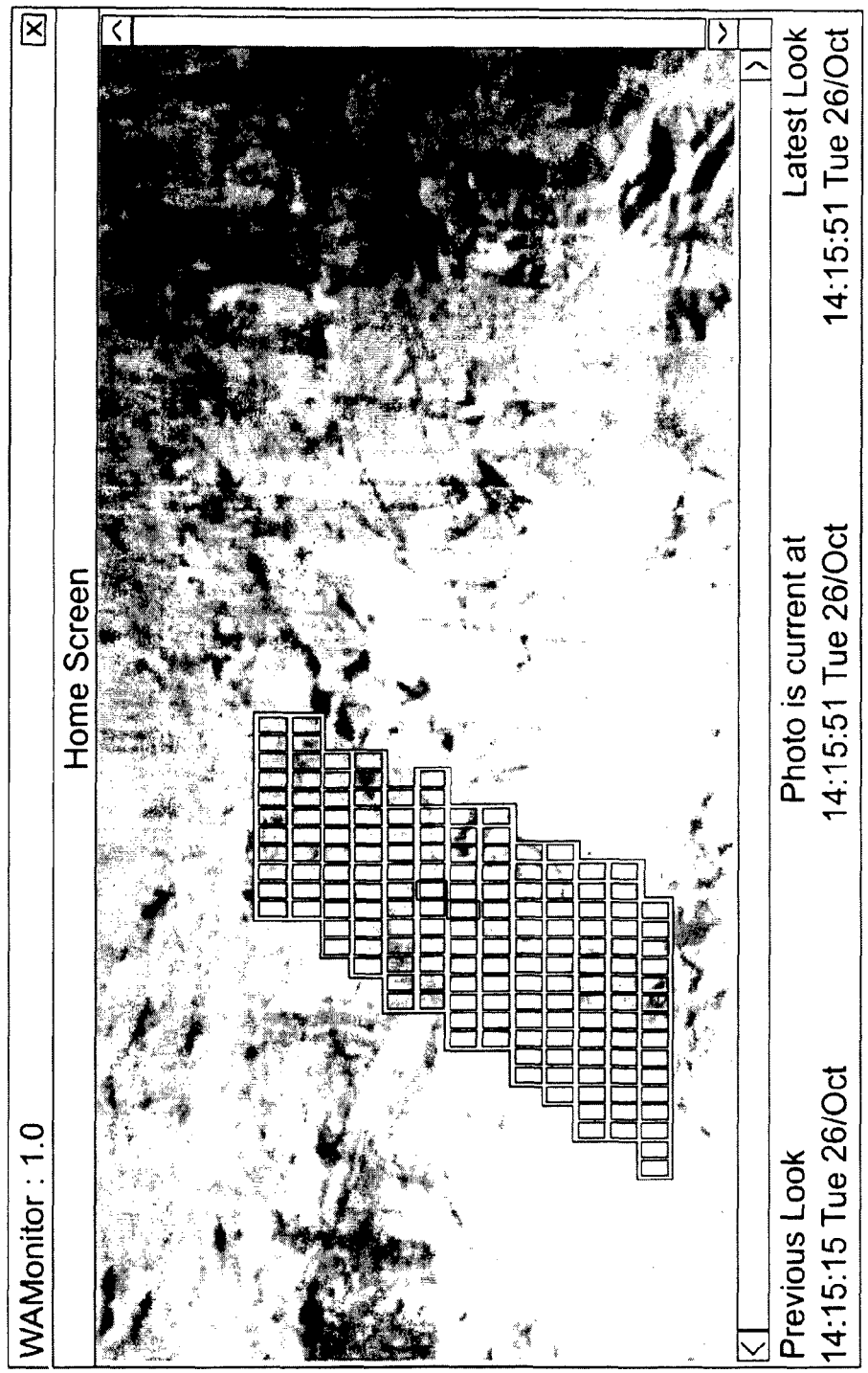
FIG. 11 shows the screen of FIG. 9 with more slope movement.

In the absence of any detected movement the screen 23 will display the work area, as shown in FIG. 9. In one embodiment, if the Work Area Monitor 10 detects movement within the selected work area the pixels that have movement are highlighted, for example by rendering the pixel boundaries in yellow as shown in FIG. 10. The pixel boundaries may also flash to highlight the movement. If the movement continues or expands the manner of highlighting may adjust accordingly. FIG. 11 shows a central few pixels that have larger or prolonged movement and are therefore highlighted in red. Adjacent pixels with large movement that is above the threshold may be shown in orange or red with small movement shown in yellow. Other schemes for displaying movement would also be suitable.

Figure 12:
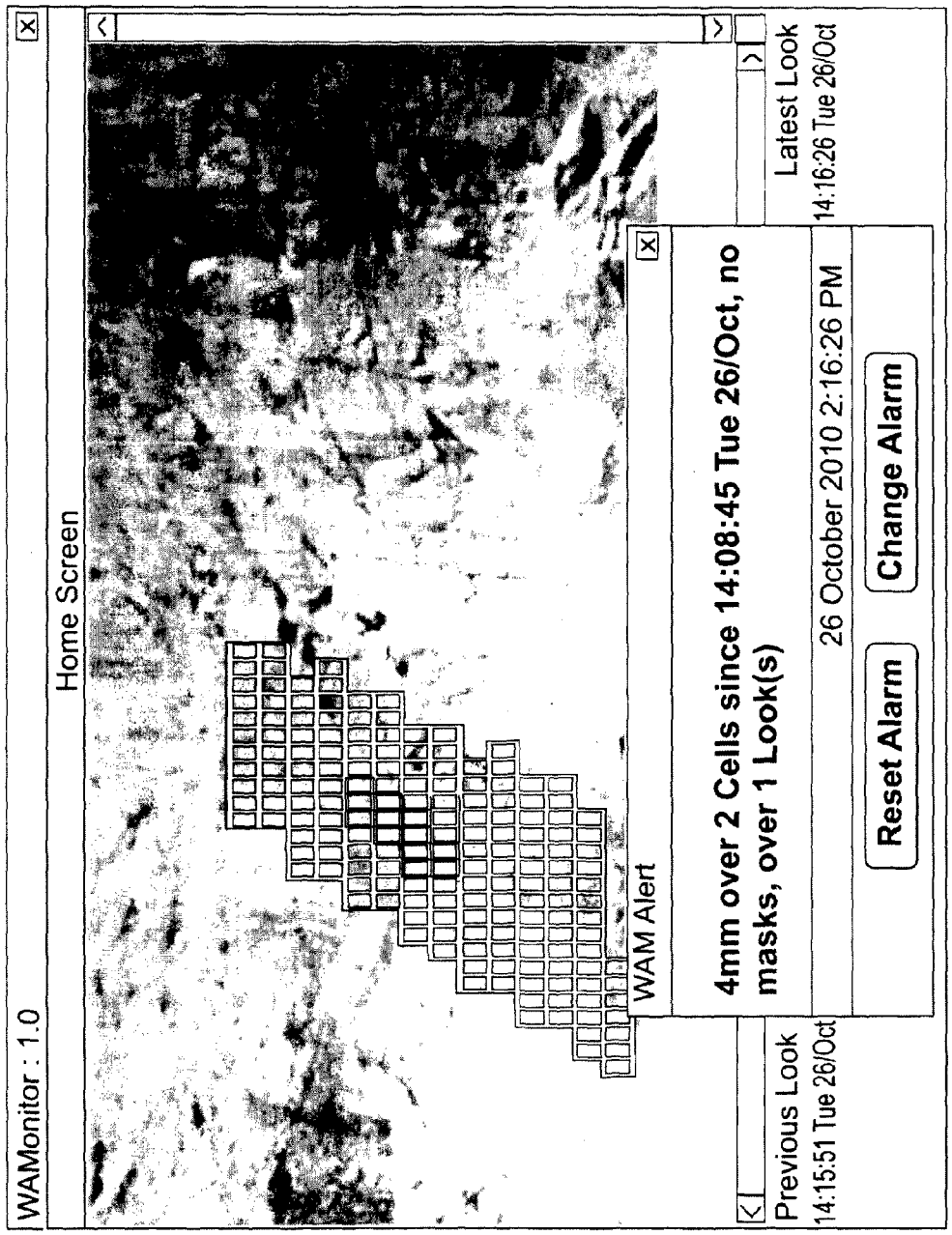
FIG. 12 shows an alert triggered by the slope movement shown.

If the movement exceeds a threshold an alarm is triggered, such as displayed in FIG. 12. The alarm may be triggered, for instance, due to the number of pixels moving, the amount of movement or the duration of movement. In FIG. 12 the alarm indicates that 2 cells moved more than 4 mm between observations.

Figure 13:
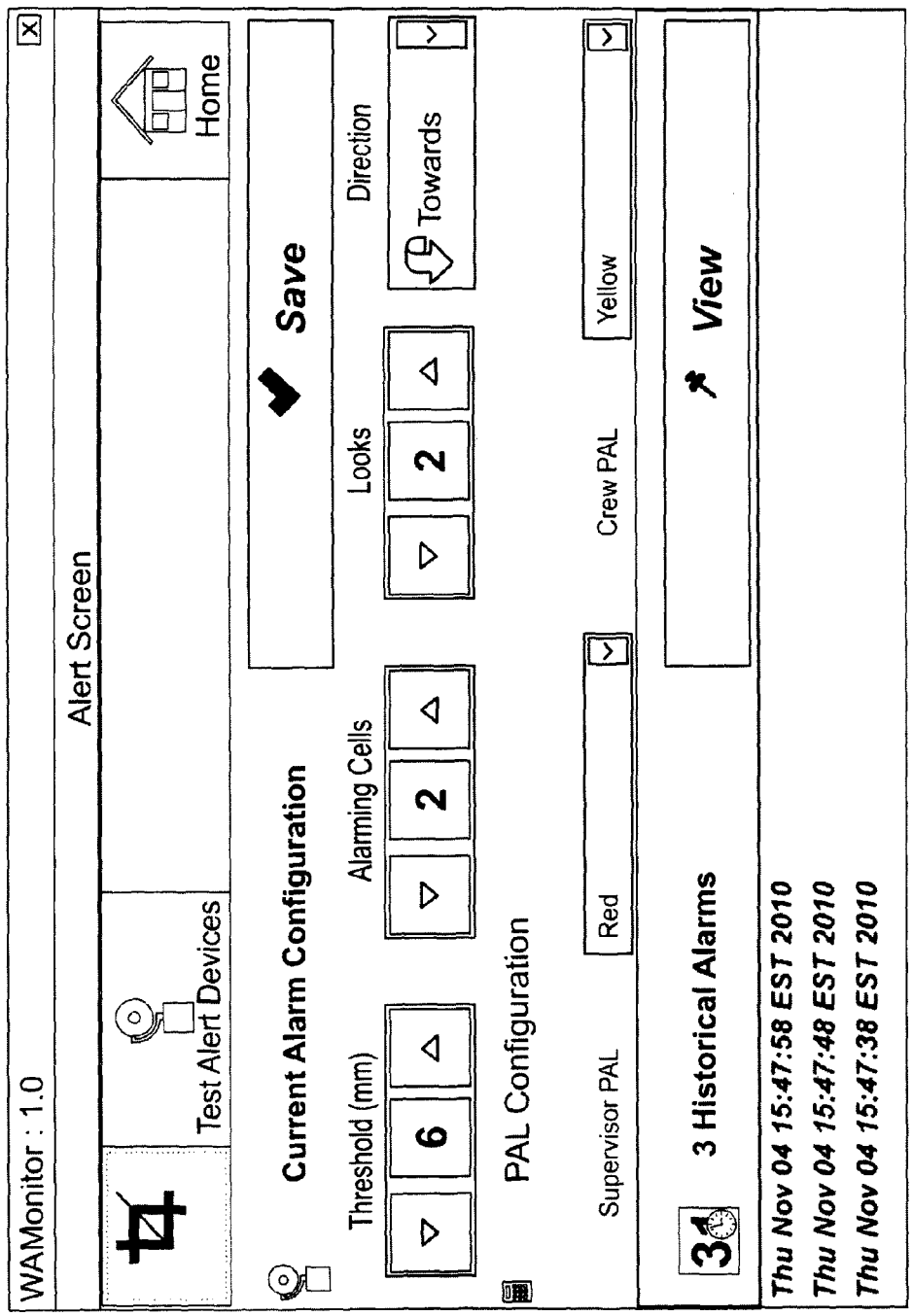
FIG. 13 shows an alert set up and adjustment screen.

It will be noted that the alarm conditions can be reset or changed by selecting either option through clicking the appropriate button shown in FIG. 12. Selecting either option takes the user to an alert screen shown in FIG. 13. On the alert screen a user can adjust various alarm conditions such as the movement threshold (in millimetres), the number of moving cells required to trigger an alarm, the number of 'looks' that need to show the movement to trigger the alarm and the direction of movement. The alert screen also may display an alert history in the current location to assist the user to determine if the alert is significant or possibly a false alarm. The alert level can also be set. For instance, FIG. 13 shows a configuration where a yellow alarm is notified to local crew but a red alarm is notified to a supervisor, as well as local crew.

Figure 14:
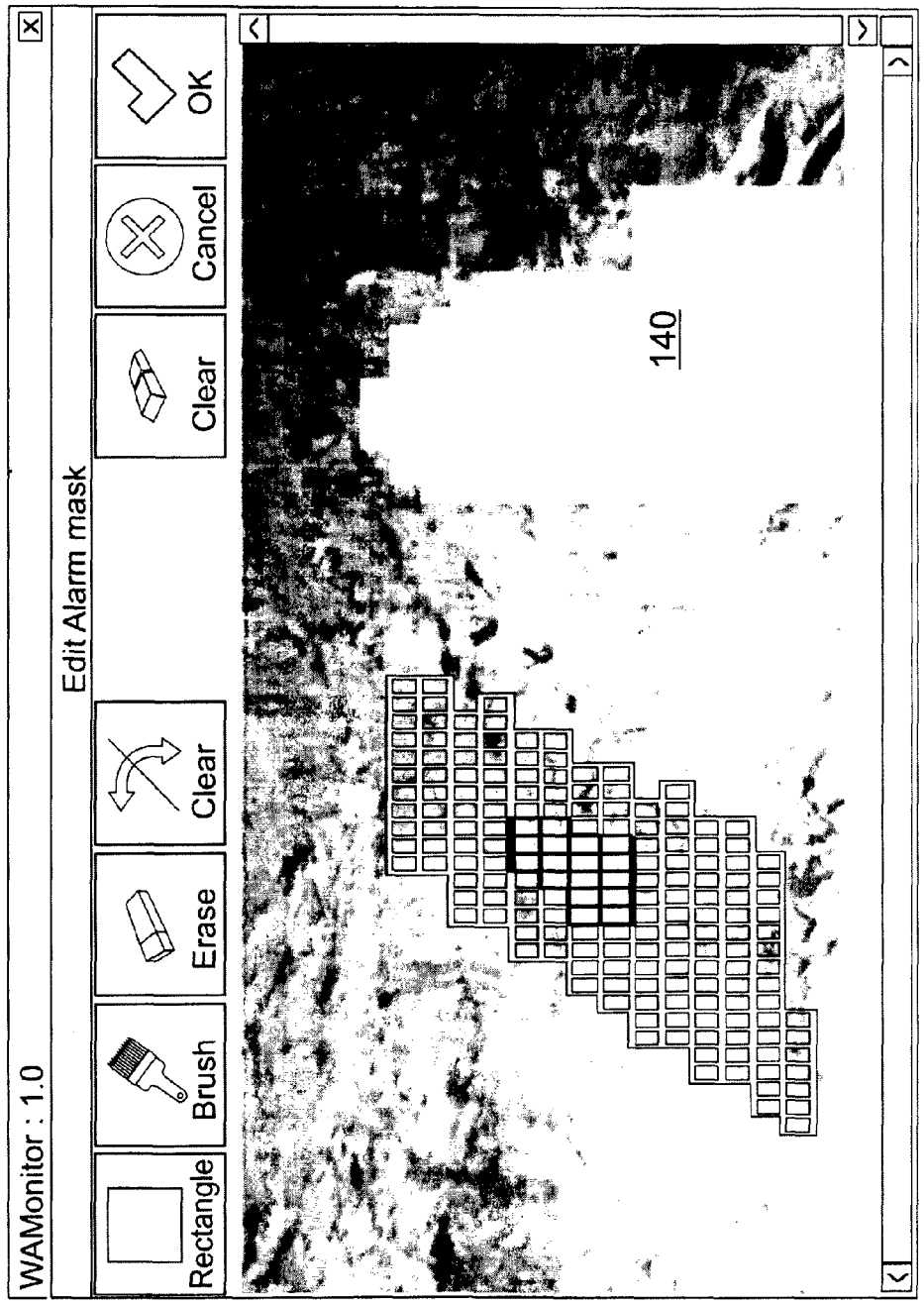
FIG. 14 shows an area masking screen.

The user can also elect to add a mask from the alert screen. This may be required, for instance, if movement is apparently due to a non-slope artefact such as the drill mast referred to earlier. Clicking the "edit mask" button takes the user to the "edit alarm mask" screen shown in FIG. 14. From this screen the user can mask out certain areas using common tools as shown across the top of the screen shot. Once selected the screen is exited by selecting "ok".

Figure 15:
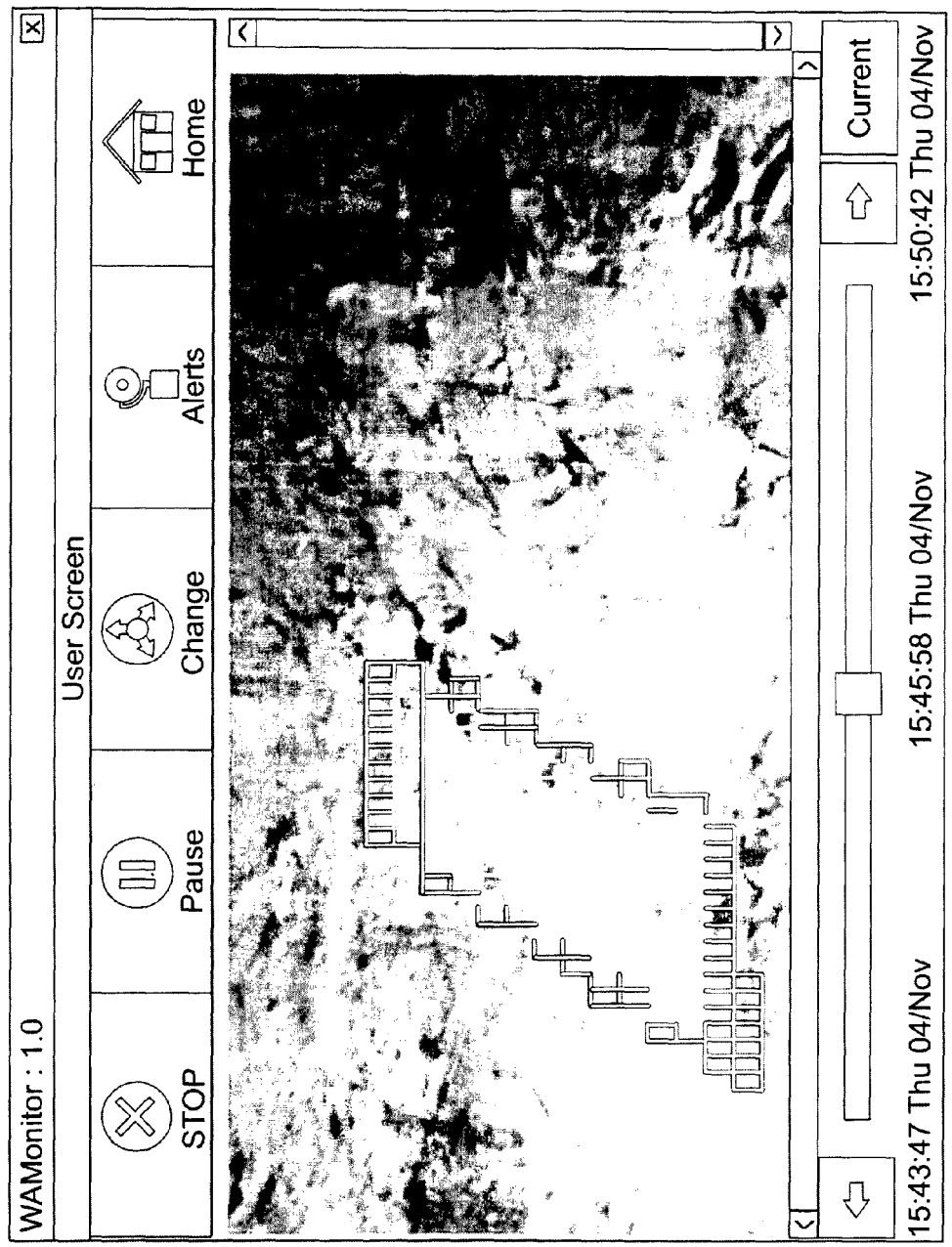
FIG. 15 shows a playback screen.

The Work Area Monitor 10 may have facility for local recording of a limited amount of history of monitoring of an area. Operation of the WAM can be paused to allow a user to play back the monitoring data to assist with deciding whether detected movement presents a safety hazard. The pause and playback screen is shown in FIG. 15. From this screen a user can playback recent recorded slope movements. The user can also access the alerts screen to make changes to the alerts.

The Work Area Monitor operates in a similar manner to the SSR described in the aforementioned United States patent but is different in a number of significant respects. Counter-intuitively it is operated on a motorised vehicle platform that can be quickly and easily moved from place to place for short range monitoring. It is designed to provide much shorter timescale monitoring with less precision but much faster scan rates than an SSR. It provides a simple and local area alarm to warn workers of slope movement in their vicinity as opposed to the broader pit monitoring and long-term deformation measurements of the known SSR system. It is particularly simple to set up and operate.

Although described by reference to application in an open-cut or pit mining situation the Work Area Monitor is not limited to any specific application. The Work Area Monitor could also be useful for underground mining operations.

The above description of various embodiments of the present invention is provided for purposes of description to one of ordinary skill in the related art. It is not intended to be exhaustive or to limit the invention to a single disclosed embodiment. As mentioned above, numerous alternatives and variations to the present invention will be apparent to those skilled in the art of the above teaching. Accordingly, while some alternative embodiments have been discussed specifically, other embodiments will be apparent or relatively easily developed by those of ordinary skill in the art. Accordingly, this invention is intended to embrace all alternatives, modifications and variations of the present invention that have been discussed herein, and other embodiments that fall within the spirit and scope of the above described invention.

The invention claimed is:

1. A Work Area Monitor comprising;
 a radar module that scans a selected field of view and collects radar images;
 a processor that processes the radar images interferometrically to extract slope movement data and analyse the slope movement data;
 a motorised automobile vehicle, wherein the radar module and the processor are mounted on the motorised automobile vehicle; and
 a stabilisation apparatus including a jack that lifts the radar module from the motorized vehicle to eliminate disturbances caused by movement of the motorised automobile vehicle.

2. The Work Area Monitor of claim 1, further comprising a display that shows an image of the field of view.

3. The Work Area Monitor of claim 1, further comprising an alarm that provides an audible, visible or tactile warning if the slope movement data exceeds a threshold.

4. The Work Area Monitor of claim 2 wherein the image is overlaid with the slope movement data.

5. The Work Area Monitor of claim 2 wherein the image is overlaid with the slope movement data if the slope movement data exceeds a threshold.

6. The Work Area Monitor of claim 1 further comprising a camera.

7. The Work Area Monitor of claim 6 wherein the field of view of the camera is aligned with the field of view of the radar.

8. The Work Area Monitor of claim 6 wherein the camera is a digital camera capable of recording sequential still images or video images.

9. The Work Area Monitor of claim 6 wherein the camera is mounted on the vehicle separate from the radar module.

10. The Work Area Monitor of claim 1 wherein the radar module is mounted on a scanning gimbal.

11. The Work Area Monitor of claim 10 wherein the scanning gimbal has a scan increment of 2°×2° pixels.

12. The Work Area Monitor of claim 1 having an operational range of about 30 m to about 200 m.

13. The Work Area Monitor of claim 2 wherein the display shows a synthetic image of the field of view generated from the radar images.

14. The Work Area Monitor of claim 13 wherein the synthetic image is a digital terrain map.

15. The Work Area Monitor of claim 2 wherein the display shows images recorded by a camera associated with the radar module.

16. The Work Area Monitor of claim 3 wherein the alarm is an audible and visible alarm on the Work Area Monitor.

17. The Work Area Monitor of claim 3 wherein the alarm is a personal alarm that is remote from the Work Area Monitor but in communication with a local work area.

18. The Work Area Monitor of claim 3 wherein the alarm is a personal alarm that generates tactile and audible alarms.

19. The Work Area Monitor of claim 3 wherein the threshold is chosen to be above an error stack of the work area monitor.

20. The Work Area Monitor of claim 3 wherein the threshold is 5 mm or less.

21. The Work Area Monitor of claim 1 wherein the vehicle is a utility automobile having a cabin and tray back.

22. The Work Area Monitor of claim 1 wherein the vehicle provides a motorised platform for deployment of the Work Area Monitor and the engine provides a source of power.

23. The Work Area Monitor of claim 1 wherein the stabilisation apparatus includes ground engaging legs to stabilise the vehicle and radar module.

24. The Work Area Monitor of claim 2 wherein the motorised automobile vehicle further comprises a passenger cabin, the display being mounted in the passenger cabin.

25. The Work Area Monitor of claim 1 wherein the stabilisation apparatus comprises a movement detector mounted on the vehicle that detects any movement of the vehicle that could be misinterpreted as a slope movement.

26. The Work Area Monitor of claim 1 further comprising an anomaly detector module that detects any foreground activity in the field of view that could cause a false alarm.

27. A method of scanning a work area for slope failure including the steps of:
   positioning a motorised automobile vehicle adjacent a slope to be monitored for failure in a work area;
   directing a field of view of a radar module mounted on the motorised automobile vehicle at the slope;
   stabilizing the radar module by lifting the radar module from the motorised vehicle to separate the radar module from vehicle movements;
   selecting a region of slope to be monitored within the field of view;
   collecting and interferometrically processing radar images from the radar module by a processor mounted on the motorised automobile vehicle to produce slope movement data.

28. The method of claim 27, further comprising the step of processing the slope movement data in a processor to generate an alarm if the slope movement data exceeds a threshold.

29. The method of claim 27 further including the step of recording an image of the field of view with a camera and displaying the image overlayed by a representation of the slope movement data.

30. The method of claim 27 further including the step of recording an image of the field of view as a radar digital terrain map and displaying the image overlayed by a representation of the slope movement data.

31. The method of claim 27 further including the step of the processor checking for stability of the radar module before generating an alarm.

32. A Work Area Monitor comprising:
   a radar module that scans a selected field of view and collects radar images;
   a processor that processes the radar images interferometrically to extract slope movement data and analyse the slope movement data;
   a motorised automobile vehicle comprising a tray back, wherein the radar module and the processor are mounted upon the tray back; and
   a stabilisation apparatus including a jack that lifts the radar module from the motorized vehicle to eliminate disturbances caused by movement of the motorised automobile vehicle.

33. The Work Area Monitor of claim 32 wherein the automobile vehicle further comprises a passenger cabin and a display that shows an image of the field of view is mounted in the passenger cabin.

34. The Work Area Monitor of claim 32 wherein the stabilisation apparatus comprises a movement detector mounted on the vehicle that detects any movement of the vehicle that could be misinterpreted as a slope movement.

35. A method of scanning a work area for slope failure including the steps of:
   positioning and stabilising a motorised automobile vehicle adjacent a slope to be monitored for failure in a work area;
   directing a field of view of a radar module mounted on the motorised vehicle at the slope;
   stabilizing the radar module by lifting the radar module from the motorised vehicle to separate the radar module from vehicle movements;
   allowing a user to select a region of slope to be monitored by the radar module within the field of view by tracing the region of the slope on a computer display device; and
   collecting and interferometrically processing radar images from the radar module by a processor to produce slope movement data.

* * * * *